N. M. McDANIEL.
NON-SKID ATTACHMENT FOR VEHICLES.
APPLICATION FILED SEPT. 24, 1920.
1,398,942.  Patented Nov. 29, 1921.
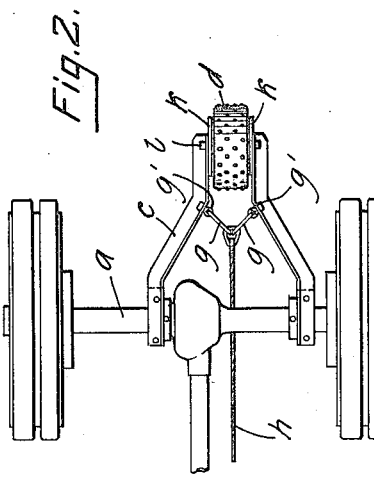
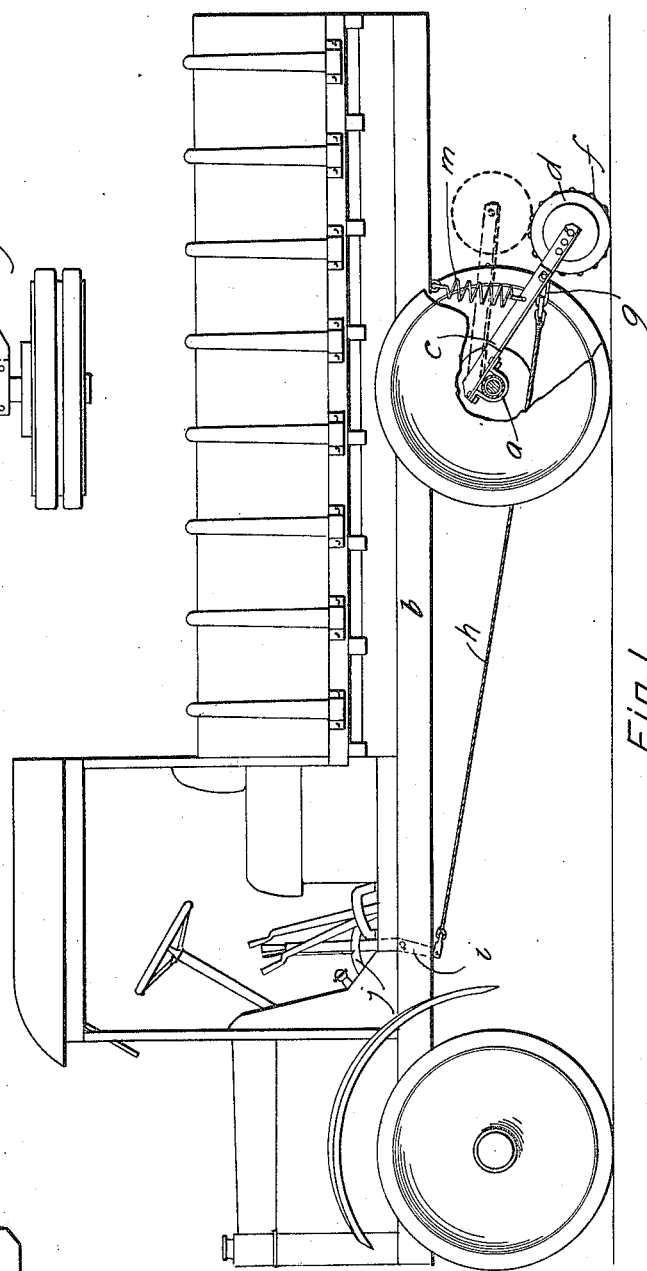
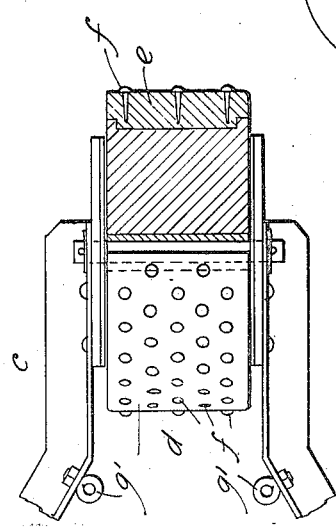
INVENTOR
Newton M. McDaniel
BY
ATTY.

UNITED STATES PATENT OFFICE.

NEWTON M. McDANIEL, OF CARLTON, OREGON, ASSIGNOR OF ONE-HALF TO CHARLES LEONARD STARR, OF PORTLAND, OREGON.

NON-SKID ATTACHMENT FOR VEHICLES.

1,398,942.     Specification of Letters Patent.     Patented Nov. 29, 1921.

Application filed September 24, 1920. Serial No. 412,443.

*To all whom it may concern:*

Be it known that I, NEWTON M. McDANIEL, a citizen of the United States, residing at Carlton, county of Yamhill, State of Oregon, have invented a certain new and useful Improvement in Non-Skid Attachments for Vehicles, of which the following is a specification.

The skidding of auto vehicles is always a menace, and has caused many serious accidents.

I have observed that it requires the application of only a relatively small force in order to hold the vehicle against skidding.

The object of my invention is to provide simple and efficient means—which may be incorporated in the running gear, or applied as an attachment to the latter—by which the skidding will be prevented, or so restrained, at all events, as to become negligible.

I attain my object by an auxiliary wheel preferably located adjacent the rear wheels of the vehicle and between the latter, and journaled on a frame pivoting on the axis of the rear wheel; and I provide means for lifting said auxiliary wheel from, and lowering and holding the same on the ground.

I further provide means whereby the auxiliary wheel may be held against rotation, thus converting the same into a drag-like brake; and in order to promote the latter feature, I prefer to provide the periphery of the auxiliary wheel with ground gripping means.

Because of the function of my auxiliary wheel I shall hereinafter refer to the same as a drag-wheel or drag element.

Other features of my invention are hereinafter fully described.

In the accompanying drawings Figure 1 shows a side elevation of an auto truck with my invention applied thereto as in practice, a portion of the rear wheel being broken away so as to disclose the arrangement of my attachment: the lifting of the drag wheel off the ground is diagrammatically shown in this figure in broken outlines.

Fig. 2 shows a top plan view of the rear portion of the running gear of the truck, and illustrates the manner in which my device may be applied to the rear axle; and Fig. 3 is a detail of the drag-wheel and a portion of its supporting frame; in the left half of this view the drag-wheel is shown as it appears when looking at the periphery thereof; and the right half shows a section giving convenient details of the construction.

To the rear axle $a$ of the truck $b$, is pivotally secured a frame $c$ in which is journaled a drag-wheel $d$. The latter is preferably provided with a peripheral shoe $e$, see Fig. 3, provided with ground gripping means such, for example, as studs $f$.

The members of the frame $c$ are adapted to permit the drawing of the free extremities thereof—between which the drag-wheel $d$ is journaled together.

To the frame $c$ are fastened links $g$, see Fig. 2, fastened to eyes $g'$; and to said links is attached a cable $h$ connected to a hand-lever $i$ which works over a quardrant $j$, so that it may be held in any position to which it is set. Thus by operating the hand-lever $i$ the cable $h$ is drawn forward and pulls with it the frame $c$ causing the drag-wheel $g$ therein journaled to bear firmly on the ground. Furthermore the pulling of the cable $h$ forward has a tendency—because of the construction of said frame $c$, and the connection of its members with the cable $h$ by the links $g$ described and more clearly illustrated in Fig. 2—to draw the members of the frame $c$ together, in so doing binding the drag-wheel $d$ and holding it against rotation, and thus in effect converting it into a drag element.

In order to promote the latter action side or binder plates $k$ are mounted on each side of the drag-wheel $d$ on its axle $l$.

Normally the frame $c$ is held suspended in the air by a contractile spring $m$.

It is to be understood that the illustration and description of my invention, merely gives one instance of detail of construction and of its mode of application.

I claim—

1. In combination with a vehicle, a frame pivoted on an axis coincident with that of the rear axis, means for holding said frame normally off the ground, a drag-wheel journaled in said frame, means for applying the drag-wheel by causing the same to bear on the ground, and operable with variable degrees of force, and means for holding said drag-wheel against rotation, such means included in said drag-wheel applying means.

2. In combination with a vehicle, a frame pivoted on an axis coincident with that of the rear axis, means for holding said frame normally off the ground, a drag-wheel journaled in said frame, means for applying the drag-wheel by causing the same to bear on the ground such means adapted to be controlled from the drivers seat and operable with variable degrees of force, and means for holding said drag-wheel against rotation, such means included in said drag-wheel applying means.

3. In combination with a vehicle, a frame pivoted on an axis coincident with that of the rear axis, means for holding said frame normally off the ground, a drag-wheel journaled in said frame, said frame comprising two members adapted for being drawn together at their free ends, and a cable, links connecting one end thereof with said frame members adjacent their free ends, and means for pulling said cable forward and holding the same, thereby to apply said drag-wheel to the ground with more or less force, and simultaneously hold said drag-wheel against rotation.

4. In combination with a vehicle, a frame pivoted on an axis coincident with that of the rear axis, means for holding said frame normally off the ground, a drag-wheel journaled in said frame, said frame comprising two members adapted for being drawn together at their free ends, plates mounted on the journal of said drag-wheel between the sides of the latter and the members of said frame, and a cable, links connecting one end thereof with said frame members adjacent their free ends, and means for pulling said cable forward and holding the same, thereby to apply said drag-wheel to the ground with more or less force, and simultaneously hold said drag-wheel against rotation.

5. In combination with a vehicle, a frame pivoted on the rear axle, means for holding said frame normally off the ground, a drag-wheel carried by said frame, means for applying the drag-wheel by causing the same to bear on the ground such means adapted to be controlled from the drivers seat and operable with variable degrees of force, and means for holding said drag-wheel against rotation, such means included in said drag-wheel applying means.

6. In combination with a vehicle, a frame pivoted on the rear axle, means for holding said frame normally off the ground, a drag-wheel journaled in said frame, said frame comprising two members adapted for being drawn together at their free ends, and a cable, links connecting one end thereof with said frame members adjacent their free ends, and means for pulling said cable forward and holding the same, thereby to apply said drag-wheel to the ground with more or less force, and simultaneously hold said drag-wheel against rotation.

7. In combination with a vehicle, a frame pivoted on the rear axle, means for holding said frame normally off the ground, a drag-wheel journaled in said frame, said frame comprising two members adapted for being drawn together at their free ends, plates mounted on the journal of said drag-wheel between the sides of the latter and the members of said frame, and a cable, links connecting one end thereof with said frame members adjacent their free ends, and means for pulling said cable forward and holding the same, thereby to apply said drag-wheel to the ground with more or less force, and simultaneously hold said drag-wheel against rotation.

NEWTON M. McDANIEL.